(12) United States Patent
Nishimura et al.

(10) Patent No.: US 7,855,869 B2
(45) Date of Patent: Dec. 21, 2010

(54) SOLID ELECTROLYTIC CAPACITOR

(75) Inventors: Koichi Nishimura, Suita (JP); Hiroshi Nonoue, Hirakata (JP); Takashi Umemoto, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 433 days.

(21) Appl. No.: 11/986,627

(22) Filed: Nov. 23, 2007

(65) Prior Publication Data

US 2008/0148541 A1 Jun. 26, 2008

(30) Foreign Application Priority Data

Dec. 20, 2006 (JP) .............................. 2006-342624

(51) Int. Cl.
*H01G 9/00* (2006.01)
(52) U.S. Cl. .................. 361/523; 361/516; 361/519; 361/529; 361/525; 361/528
(58) Field of Classification Search ................ 361/523, 361/516–519, 525–529, 540–541; 29/25.01, 29/25.03
See application file for complete search history.

(56) References Cited

U.S. PATENT DOCUMENTS

| | | | | |
|---|---|---|---|---|
| 6,036,734 A | * | 3/2000 | Taketani et al. | ............. 29/25.03 |
| 6,333,844 B1 | * | 12/2001 | Nakamura | ................... 361/523 |
| 6,791,822 B2 | * | 9/2004 | Kochi et al. | .................. 361/523 |
| 6,956,732 B1 | * | 10/2005 | Yano et al. | ................... 361/524 |
| 7,038,902 B2 | * | 5/2006 | Takatani et al. | ............. 361/524 |
| 7,177,141 B1 | * | 2/2007 | Iida et al. | ..................... 361/540 |
| 7,349,198 B2 | * | 3/2008 | Yano et al. | ................... 361/524 |

FOREIGN PATENT DOCUMENTS

| JP | 06-151258 | 5/1994 |
|---|---|---|
| JP | 2000-068157 | 3/2000 |
| JP | 2004-018966 | 1/2004 |

* cited by examiner

*Primary Examiner*—Nguyen T Ha
(74) *Attorney, Agent, or Firm*—Masuvalley & Partners

(57) ABSTRACT

An object of the present invention is to provide a solid electrolytic capacitor having a low defective fraction. A solid electrolytic capacitor of the present invention includes an anode structured by an anode lead formed by a valve metal, and porous body of valve metal connected to the anode, and a dielectric layer provided on a surface of the anode wherein a Vickers hardness of the anode lead, which is positioned at not more than 20 μm in depth from a surface of the anode lead is set 30 Hv-70 Hv.

12 Claims, 3 Drawing Sheets

SOLID ELECTROLYTIC CAPACITOR

TECHNICAL FIELD

The present invention relates to a solid electrolytic capacitor having superiority in lowering defective fraction.

BACKGROUND OF THE INVENTION

With respect to the solid electrolytic capacitor, Unexamined Japanese Patent Application Publication Nos. 6-151258 and 2004-18966 disclose a solid electrolyte capacitor having a manufacturing method including steps of anodizing an anode formed by valve metal, such as, aluminum, titanium, niobium and tantalum in the aqueous solution of phosphoric acid, forming a dielectric layer on the surface of the anode, providing an electrolytic layer structured by oxide having conductivity or conductive high polymer on the dielectric layer, taking out an anode terminal and a cathode terminal from capacitor element proving a carbon layer and a silver layer onto the electrolyte layer as the cathode terminal, and forming outer case by resin thereafter.

In recent years, the minimization and movement to large capacity of the solid electrolytic capacitor have been required. Instead of using conventional aluminum oxide and tantalum oxide as a dielectric, a solid electrolytic capacitor utilizing niobium oxide having a large dielectric constant has been proposed in Unexamined Japanese Patent Application Publication Nos. 2000-68157.

However, there has been a problem that a defective fraction becomes large due to the increase of leak current of final product on the manufacturing process of the conventional solid electrolytic capacitor as described above.

SUMMARY OF THE INVENTION

It is therefore an object of the present invention is to provide a solid electrolytic capacitor having a low defective fraction, which solves the problem described above.

In order to overcome the above drawbacks, an solid electrolytic capacitor of the present invention including an anode structured by an anode lead formed by a valve metal, and porous body of valve metal connected to the anode lead, and a dielectric layer provided on a surface of the anode, wherein a Vickers hardness of the anode lead at not more than 20 μm from a surface of the anode lead is 30 Hv-70 Hv.

Following is a cause of the problem that the defective fraction becomes high on the solid electrolytic capacitor. On the mold process for forming an outer case of the solid electrolytic capacitor, since melted resin is injected into a metal die with pressure, the melted resin invades adjacent porous body along the anode lead. Then, since the melted resin solidifies therein, the porous body exfoliates together with a part of oxide-film, which is the dielectric layer causing a short circuit between the conductive high polymer layer and the anode lead. According to the present invention, the contactability of the anode lead and the porous body is improved, and the structure can stand the stress when forming the outer case as the defective fraction can be lowered by setting the hardness of the anode lead within a range of about 30-70 Hv.

The present invention is characterized that the outer diameter of the anode lead of the solid electrolytic capacitor of the present invention is about from 0.2 to 0.8 mm.

Based on this arrangement, the strength, which is capable of practically holding porous body, can be secured. Further, the possibility to generate defects that the porous body peels from the anode lead due to the melted resin can be lowered.

In order to overcome the above drawbacks, a method for manufacturing an solid electrolytic capacitor of the present invention including the steps of heating an anode lead formed by a valve metal, setting a Vickers hardness of the anode lead at not more than 20 μm from a surface of the anode lead 30 Hv-70 Hv by adjusting a cooling rate of the anode lead, forming a porous body so as to be connected to the anode lead, anodizing the anode lead and the porous body and forming a dielectric layer on a surface of the anode lead and the porous body, and forming a conductive high polymer on the dielectric layer.

Based on this arrangement, it becomes possible to provide an anode lead having an adjusted Vickers hardness of a proper hardness by setting a Vickers hardness of the anode lead at not more than 20 μm in depth from a surface toward inside of the anode lead, and a solid electrolytic capacitor having a low defective fraction.

According to a solid electrolytic capacitor of the present invention, the contactability of an anode lead and a porous body can be improved and a defective fraction can be reduced.

DETAILED DESCRIPTION OF THE INVENTION

An embodiment of the present invention will be described by referring to drawings. The present invention is not limited to this embodiment.

Embodiment

Figure 1:
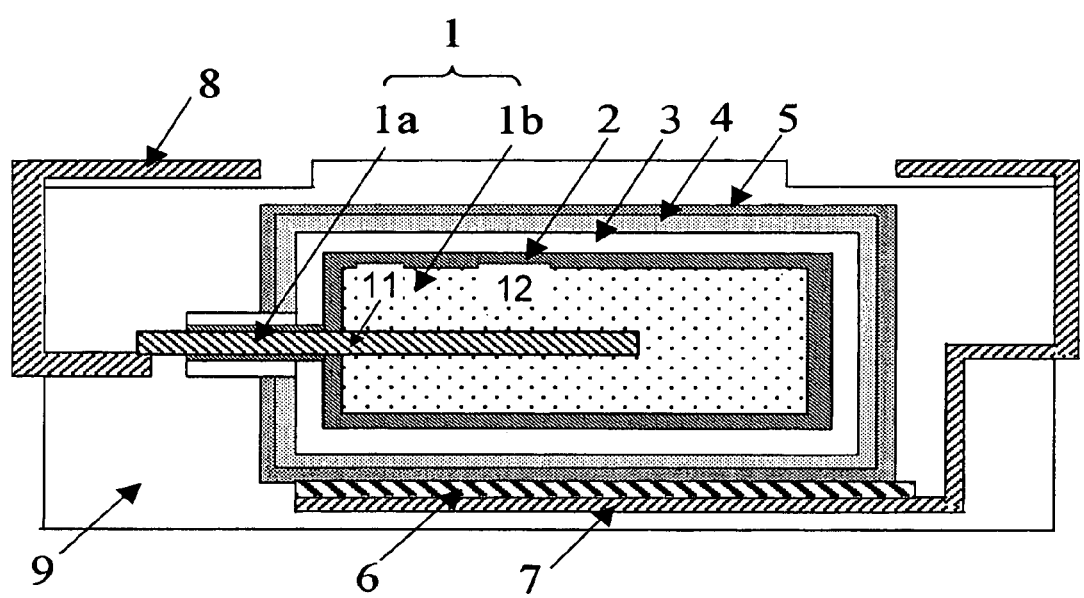
FIG. 1 illustrates a cross-sectional structure view of a solid electrolytic capacitor of an embodiment of the present invention.

FIG. 1 illustrates a cross-sectional structure view of a solid electrolytic capacitor of an embodiment of the present invention. The structure of the solid electrolytic capacitor of an embodiment of the present invention will be described by referring to FIG. 1 hereinafter.

As illustrated in FIG. 1, in the solid electrolytic capacitor of the present invention, an anode 1 is structured by an anode lead 11 formed by a valve metal and a sintered porous body 12 having a rectangular parallelepiped shape obtained by sintering and forming metal particles of valve metal in a vacuum on the circumference of the anode lead 11. A part of the anode lead 11 is buried into the sintered porous body 12.

Here, the valve metal structuring the anode lead 11 and the sintered porous body 12 is not limited as long as a metal material capable of forming an oxide layer thereon. Titanium, tantalum, aluminum, niobium, hafnium, zirconium, zinc, tungsten, bismuth and antimony may be utilized. The sintered porous body 12 can be obtained by sintering these metal particles. Among these, with respect to the material, from the viewpoint that the dielectric constant of the oxide layer is high and the acquisition of raw material is easy, titanium, tantalum, aluminum and niobium are preferable. Particularly, niobium having the dielectric constant of an oxide layer, which is 1.5 times larger than that of tantalum or titanium having dielectric constant, which is 2-3 times larger than that of tantalum, is further preferable. In case when the anode lead 11 is structured by niobium, from the viewpoint of improvement of the contactability with the sintered porous body 12, niobium, which is the same metal as the anode lead 11, is preferred to be utilized as a material of the sintered porous body 12.

With respect to the valve metal structuring the anode lead 11 and the sintered porous body 12, the alloy of the valve metals described above may be utilized. With respect to the alloy, an alloy of the valve metal and the other kind of metal may be utilized. However, in this case, it is preferable that the percentage of the valve metal is not less than 50%.

Meanwhile, the sintered porous body 12 is utilized as a porous body of the valve metal. Instead of the sintered porous body 12, an embodiment of the present invention may be reduced to practice by utilizing a porous body of porous metal material and net-like structure metal, which do not depend on the sintering process.

Next, a dielectric layer 2 structured by an oxide layer of a valve metal is formed on the surface of an anode 1 structured by the anode lead 11 and the sintered porous body 12. For example, in case when the valve metal is structured from niobium metal, the dielectric layer 2 will be niobium oxide.

The dielectric layer 2 is formed by anodizing the anode 1 in the aqueous solution, such as, phosphoric acid. Thus, the dielectric layer 2 is formed onto the valve metal surface also inside many holes of the sintered porous body 12 structuring the anode 1. With respect to the thickness of the film of the dielectric layer 2, about 10 nm-500 nm is preferable. In case when the thickness the film of the dielectric layer is more than 500 nm, an electrostatic capacity reduces and at the same time inconvenience, such as, exfoliation of the dielectric layer 2 from the anode 1 tends to occur. On the other hand, in case when the thickness of the film of the dielectric layer 2 is thinner than 10 nm, there is a possibility that breakdown voltage reduces and at the same time leak current increase.

On the dielectric layer 2, a conductive high polymer layer 3 composed of polypyrrol acting as an electrolyte layer is formed and the conductive high polymer layer 3 is filled even inside the many holes of the sintered porous body 12. With respect to the material of the conductive high polymer layer 3, it is not limited to a specific material as long as it is a high polymer material having conductivity. Particularly, materials having superior conductivity, such as, polypyrrol, polyaniline and polythiophene may be utilized.

A first conductive layer 4 is structured by a layer including carbon particles by applying carbon paste on the conductive high polymer layer 3 and drying the applied carbon paste. A second conductive layer 5 is structured by a layer including silver particles by applying silver paste on the first conductive layer 4 and drying the applied silver paste.

A cathode terminal 7 is connected to the second conductive layer 5 via conductive adhesive 6 and an anode terminal 8 is connected to the anode lead 11 of the anode 1. Then, a molded outer case resin 9 structured by epoxy resin is formed so that the anode terminal 8 and the cathode terminal 7 are taken out from the molded outer case resin 9. With respect to the materials of the anode terminal 8 and the cathode terminal 7, a conductive material, such as, nickel can be utilized. The anode terminal 8 and the cathode terminal 7 exposed from the molded outer case resin 9 function as the terminals of the solid electrolytic capacitor.

Figure 2:
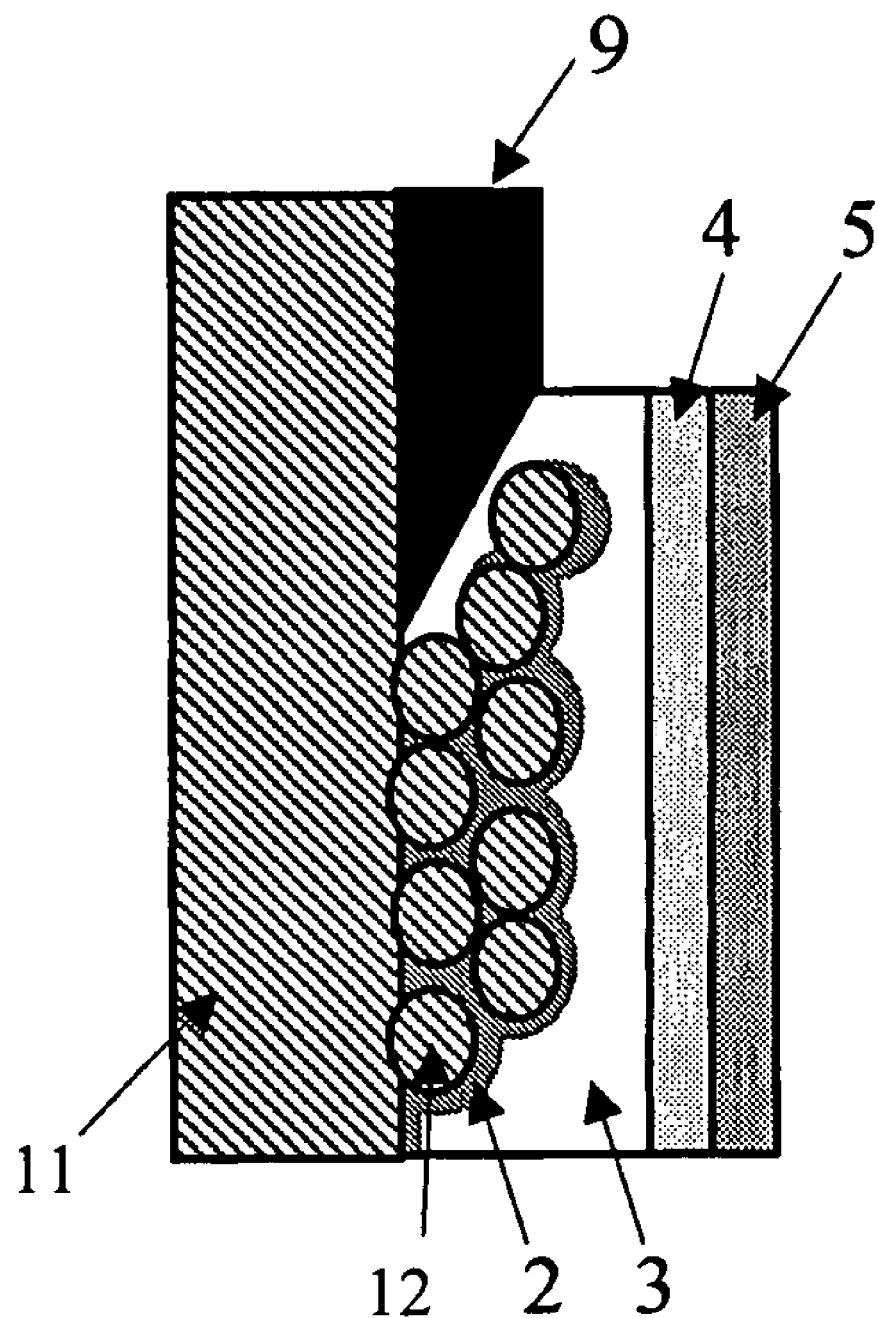
FIG. 2 illustrates an enlarged schematic view of adjacent to a conventional anode lead.

Next, the relationship between the hardness and contactability of the surface of the anode lead 11 will be described by referring to FIGS. 2 and 3. FIG. 2 illustrates an enlarged schematic view of adjacent to a conventional anode lead. In FIG. 2, a high hardness material is used as the surface of the anode lead.

In FIG. 2, in case when sintering the sintered porous body 12, sintering is conducted by inserting the anode lead 11 into a container filled with metal particles of valve metal, pressuring and heating them. Thus, in case when the hardness of the surface of the anode lead 11 is high, as illustrated in FIG. 2, the metal particles structuring the sintered porous body 12 remain on the surface of the anode lead 11 and are not pressed inside the surface of the anode lead 11. Accordingly, the contactability between the anode lead 11 and the sintered porous body 12 becomes low.

Thus, on a mold process for forming the outer case of the solid electrolytic capacitor, in case when injecting melted resin 9 into the metal jig with pressure, the melted resin enters in adjacent to the sintered porous body 12 along the anode lead 11 and solidifies there. Thus, a part of an oxide layer, which is the dielectric layer 2, exfoliates together with a part of the sintered porous body 12 from the anode lead 11. Thus a short circuit is formed between the conductive polymer layer 3 and the anode lead 11. As a result, a defective fraction increases.

Figure 3:
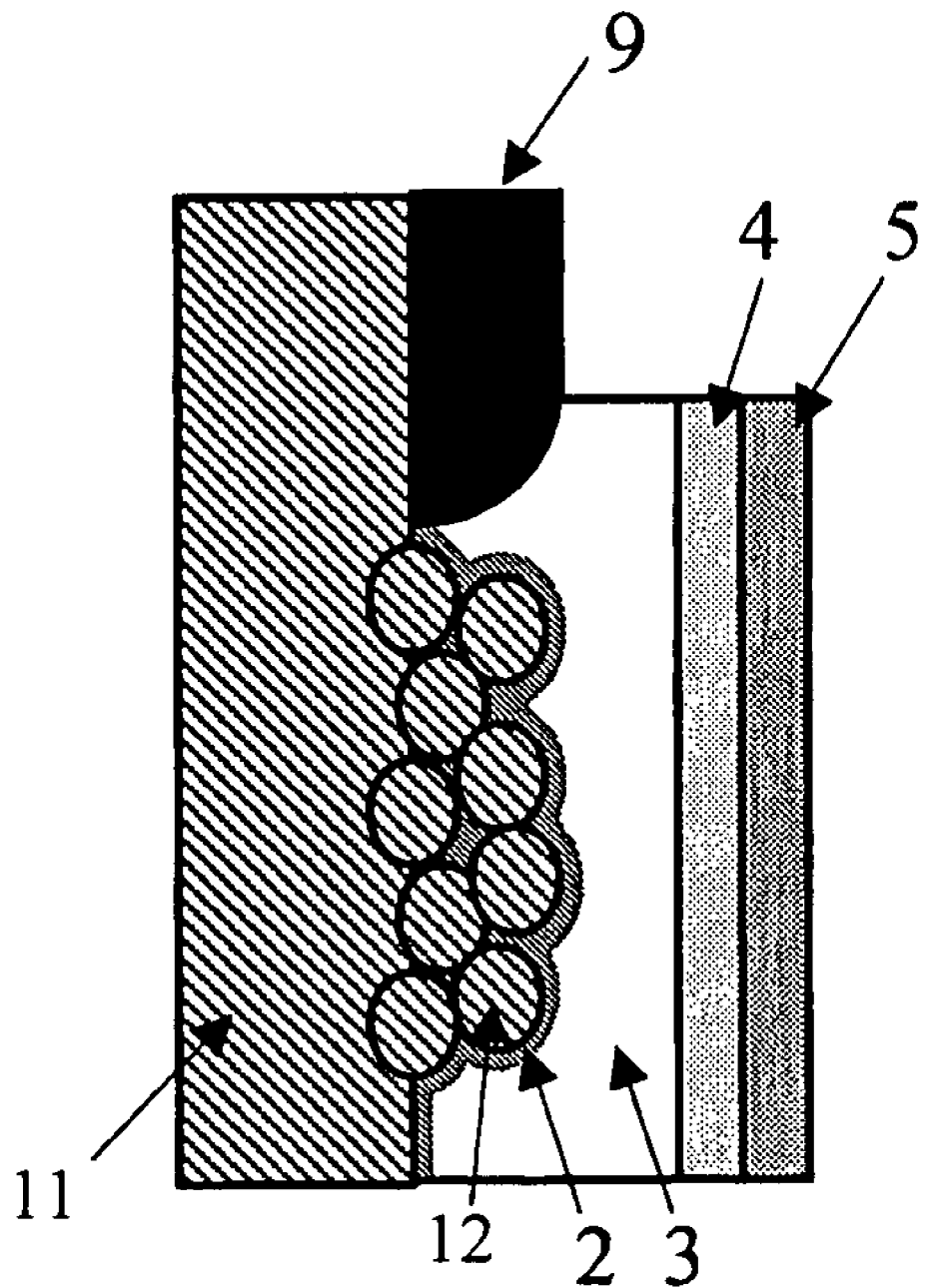
FIG. 3 illustrates an enlarged schematic view of adjacent to an anode lead of the present invention.

FIG. 3 illustrates an enlarged schematic view of adjacent to an anode lead of the present invention. In FIG. 3, the material having a low hardness is utilized for the surface of the anode lead. In FIG. 3, in case when sintering the sintered porous body 12, sintering is conducted by inserting the anode lead 11 into a container filled with metal particles of valve metal, pressuring and heating them. In FIG. 3, a low hardness material is utilized for the surface of the anode lead 11, which is different from the one in FIG. 2. Thus, the sintering is conducted in the state that a part of the metal particles is pressed inside the anode lead 11.

Thus, the contactability of the anode lead 11 and the sintered porous body 12 will be improved. As a result, the exfoliation of the sintered porous body 12 and the dielectric layer 2 as explained in FIG. 2 does not occur and a defective fraction can be decreased.

With respect to the manufacturing method of the anode lead 11 of the present invention, a method of controlling the hardness by heating the anode 11 in a vacuum (not more than $1\times10^{-4}$ Pa) at 700° C. for 100 minutes, and then adjusting the cooling rate may be given.

The control of the hardness of the anode lead 11 was executed as following. Firstly, the anode lead 11, which was formed from wire made of niobium (manufactured by Starck Ltd) having a purity of 99.9% and a diameter of 0.5 mm, was heated in the vacuum (not more than $1\times10^{-4}$ Pa) at 700° C. for 100 minutes. After that, the anode lead 11 was cooled down to a room temperature under the seven conditions with the cooling rate of 0.02° C./minute, 0.05° C./minute, 0.1° C./minute, 0.5° C./minute, 1° C./minute, 5° C./minute and 10° C./minute. The hardness of the anode lead 11 was measured at following three points of 20 μm, 50 μm and 250 μm from the surface of the anode lead 11.

The Vickers hardness is one of material hardness test method. Since the test is simple as the Brinell hardness, Rockwell hardness and Shore harness, the Vickers hardness is practically and widely utilized. The Vickers hardness may be obtained when a diamond indenter with the shape of square-based pyramid pressed onto a test surface with a constant load, and dividing the load by the surface area of a permanent indentation.

The measurement of the Vickers hardness of the anode lead 11 was conducted as following. The anode lead 11 is cut to form a cross section. The values of the Vickers hardness of the points of 20 μm, 50 μm and 250 μm from the surface toward inside of the anode lead 11 were obtained by pressing the points of 20 μm, 50 μm and 250 μm from the edge of the cross section with a load of 50 gf by using a Vickers hardness meter (AMT-7FS Manufactured by Matsuzawa).

The size of the anode lead 11 is practically able to make the sintered porous body of the capacitor and is necessary to secure the strength to hold the sintered porous body. In case when the shape of the cross section of the anode lead is circle, the diameter of the anode lead is preferred to be about 0.2-0.8 mm. In the case that the shape of the cross section of the anode lead is rectangular, the length of the diagonal line is preferred to be about 0.2-0.8 mm.

Embodiment 1

As an embodiment 1, a sintered porous body 12, metal particles of which have been welded each other by sintering the metal particles having average particle diameter of 2 μm around the anode lead 11 made of niobium (the Vickers hardness at 20 μm from the surface is 30 Hv) with a cooling rate of 0.1° C./minute in a vacuum is formed. The dimensions of the sintered porous body 12 are about 4 mm in the length, about 3 mm in the width and about 2 mm in the thickness.

Further, the anode 1 structured by the anode lead 11 and the sintered porous body 12 has been anodized with about 10V of constant voltage for about ten hours in aqueous solution of phosphoric acid of 5 weight-% kept at about 60° C. to form dielectric layer 2 formed by niobium oxide having a thickness of about 25 nm on the surface of the anode 1.

Next, a conductive high polymer layer 3 composed of polypyrrol is formed on the surface of the dielectric layer 2. Further, carbon paste and silver paste are applied thereon. Then the carbon paste and the silver paste are dried to form the first conductive layer 4 and the second conductive layer 5.

The conductive adhesive 6 is formed on the top surface of the circumference of the second conductive layer 5 and further, the cathode terminal 7 is formed on the conductive adhesive 6. The edge of the side, where the anode lead 11 has not been buried into the sintered porous body 12, is exposed from the dielectric layer 2 and the conductive polymer layer 3, and the anode terminal 8 is connected to the edge thereof.

Further, the molded outer case resin 9, which is formed of the epoxy resin, is formed to have the edge of the anode terminal 8 and the cathode terminal 7 taken out from the molded outer case resin 9. In this way, the solid electrolytic capacitor of the embodiment 1 is structured.

Embodiment 2

In the embodiment 2, the same solid electrolytic capacitor as that of embodiment 1 is formed, except that, as for the anode lead 11 of the embodiment 1, the anode lead 11 structured by niobium (the Vickers hardness is 45 Hv at a point of 20 μm from the surface) with a cooling rate of 0.5° C./minute is used.

Embodiment 3

In the embodiment 3, the same solid electrolytic capacitor as that of embodiment 1 is formed, except that, as for the anode lead 11 of the embodiment 1, the anode lead 11 structured by niobium (the Vickers hardness is 65 Hv at a point of 20 μm from the surface) with a cooling rate of 1° C./minute is used.

Embodiment 4

In the embodiment 4, the same solid electrolytic capacitor as that of embodiment 1 is formed, except that, as for the anode lead 11 of the embodiment 1, the anode lead 11 structured by niobium (the Vickers hardness is 70 Hv at a point of 20 μm from the surface) with a cooling rate of 5° C./minute is used.

Comparison Example 1

In the comparison example 1, the same solid electrolytic capacitor as that of embodiment 1 is formed, except that, as for the anode lead 11 of the embodiment 1, the anode lead 11 structured by niobium (the Vickers hardness is 20 Hv at a point of 20 μm from the surface) with a cooling rate of 0.02° C./minute is used.

Comparison Example 2

In the comparison example 2, the same solid electrolytic capacitor as that of embodiment 1 is formed, except that, as for the anode lead 11 of the embodiment 1, the anode lead 11 structured by niobium (the Vickers hardness is 25 Hv at a point of 20 μm from the surface) with a cooling rate of 0.05° C./minute is used.

Comparison Example 3

In the comparison example 3, the same solid electrolytic capacitor as that of embodiment 1 is formed, except that, as for the anode lead 11 of the embodiment 1, the anode lead 11 structured by niobium (the Vickers hardness is 110 Hv at a point of 20 μm from the surface) with a cooling rate of 10° C./minute is used.

Comparison Example 4

In the comparison example 4, the same solid electrolytic capacitor as that of embodiment 1 is formed, except that, as for the anode lead 11 of the embodiment 1, the anode lead 11 structured by niobium (the Vickers hardness is 170 Hv at a point of 20 μm from the surface) with no heating process applied is used.

EVALUATION

Next, leak current was respectively measured by using a direct current voltage source for a certain number of elements of solid electrolytic capacitors from the embodiments 1-4 and the comparison examples 1-4. Practically, 3V of direct current voltage was applied onto respective capacitors and the leak current was measured after five minutes. The element having the leak current value not less than 1 mA after five minutes is determined to be a defective unit and a defective fraction is obtained by comparing the number of defective unit against the measured units in each embodiment and comparison example. Table 1 illustrates these results. The defective fraction includes the one, which has been damaged on the capacitor production process.

TABLE 1

| | COOLING RATE (° C./MIN.) | VICKERS HARDNESS (Hv) | | | DEFECTIVE FRACTION (%) |
|---|---|---|---|---|---|
| | | 20 μm | 50 μm | 250 μm | |
| COMPARISON EXAMPLE 1 | 0.02 | 20 | 20 | 20 | 40 |
| COMPARISON EXAMPLE 2 | 0.05 | 25 | 20 | 20 | 20 |
| EMBODIMENT 1 | 0.1 | 30 | 25 | 25 | 5 |
| EMBODIMENT 2 | 0.5 | 45 | 40 | 35 | 5 |
| EMBODIMENT 3 | 1.0 | 65 | 50 | 45 | 5 |

TABLE 1-continued

| | COOLING RATE (° C./MIN.) | VICKERS HARDNESS (Hv) | | | DEFECTIVE FRACTION (%) |
|---|---|---|---|---|---|
| | | 20 μm | 50 μm | 250 μm | |
| EMBODIMENT 4 | 5.0 | 70 | 65 | 65 | 10 |
| COMPARISON EXAMPLE 3 | 10.0 | 110 | 90 | 80 | 20 |
| COMPARISON EXAMPLE 4 | NO HEAT PROCESS | 170 | 130 | 120 | 30 |

As illustrated in Table 1, the value of the Vickers hardness tends to become high as the distance from the surface toward inside becomes short, namely, as approaching to the surface of the anode lead 11. Taking account that the effect to the contactability to the sintered porous body 12, it is important to adjust the hardness at a point 20 μm from the surface to a proper value.

According to Table 1, in case when the hardness at the point 20 μm from the surface of the anode lead 11 is within a range of 30-70 Hv, the defective fraction can be regulated to not more than 10%, which is an acceptable level on the production line of the product. Further, in case when the hardness at the point 20 μm from the surface of the anode lead 11 is within a range of 30-65 Hv, the defective fraction can be regulated to not more than 5%.

This is thought that the hardness of the surface of the anode lead 11, which contacts the sintered porous body 12, is within this range, the contactability of the niobium metal powder and the wire improves when forming the sintered porous body 12. Thus, it is effective for improving the contactability especially when the hardness is set within this range at the point, where the adjacent surface (adjacent to the point of 20 μm) directly contacts the powder.

Meanwhile, in case when the Vickers hardness at the point of 20 μm from the surface is less than 30 Hv, since deformation of the anode lead 11 becomes too large, the damage on the capacitor production process tends to occur due to the insufficiency of the strength of the anode lead 11. Further, in case when the Vickers hardness at the point of 20 μm from the surface is more than 70 Hv, it is thought that since the contact area between the niobium metal powder and the surface of the anode lead 11 becomes small, the contactability decreases. Thus, the defective fraction can be decreased by setting the hardness of the anode lead 11 within a range of 30-70 Hv.

As described above, since the defective fraction of the solid electrolytic capacitor of the present invention can be reduced, the production yield of the solid electrolytic capacitor can be improved.

What is claimed is:

1. A solid electrolytic capacitor comprising:
   an anode structured by an anode lead formed by a valve metal, and a porous body of valve metal connected to the anode, and;
   a dielectric layer provided on a surface of the anode;
   wherein a Vickers hardness of the anode lead at not more than 20 μm in depth from a surface of the anode lead is 30 Hv-70 Hv.

2. The solid electrolytic capacitor of claim 1,
   wherein the valve metal is formed by a metal including niobium.

3. The solid electrolytic capacitor of claim 1,
   wherein the dielectric layer is formed by oxide of valve metal.

4. The solid electrolytic capacitor of claim 3,
   wherein the oxide of valve metal is an oxide including niobium oxide.

5. The solid electrolytic capacitor in any one of claims 1, 2 and 3,
   wherein a size of the anode lead is about 0.2-0.8 mm.

6. The solid electrolytic capacitor of claim 1, further comprising:
   a conductive high polymer layer on the dielectric layer.

7. The solid electrolytic capacitor of claim 6,
   wherein the conductive high polymer is formed by a high polymer including polypyrrol, polyaniline and polythiophene.

8. A method of manufacturing a solid electrolytic capacitor comprising the steps of:
   heating an anode lead formed by a valve metal;
   setting a Vickers hardness of the anode lead at not more than 20 μm in depth from a surface of the anode lead in a range of 30 Hv-70 Hv by adjusting a cooling rate of the anode lead;
   forming a porous body so as to be connected to the anode lead; and
   anodizing the anode lead and the porous body and forming a dielectric layer on a surface of the anode lead and the porous body.

9. The method of manufacturing a solid electrolytic capacitor of claim 8, further comprising the step of:
   forming a conductive high polymer on the dielectric layer.

10. The method of manufacturing a solid electrolytic capacitor of claim 8,
    wherein the valve metal is formed by a metal including niobium.

11. The method of manufacturing a solid electrolytic capacitor of claim 8, further comprising the step of:
    setting a size of the anode lead to be about 0.2-0.8 mm.

12. The method of manufacturing an solid electrolytic capacitor of claim 8,
    wherein the dielectric layer is formed by an oxide including niobium oxide.

* * * * *